(12) United States Patent
Reisacher et al.

(10) Patent No.: US 6,284,035 B1
(45) Date of Patent: Sep. 4, 2001

(54) PIGMENT PREPARATIONS IN GRANULE FORM

(75) Inventors: Hansulrich Reisacher, Maxdorf; Anton Dotter, Hockenheim; Gerhard Berger, Stuttgart; Otmar Pelz, Besigheim; Oliver Seeger, Mannheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/391,620

(22) Filed: Sep. 7, 1999

(30) Foreign Application Priority Data

Sep. 10, 1998 (DE) ................................. 198 41 377

(51) Int. Cl.⁷ ....................... C09B 67/22; C09B 67/04; C09C 1/00
(52) U.S. Cl. ................ 106/493; 106/412; 106/433; 106/447; 106/494; 106/495; 106/496; 106/497; 106/498; 106/499
(58) Field of Search ............................... 106/412, 433, 106/447, 493, 494, 495, 496, 497, 498, 499

(56) References Cited

U.S. PATENT DOCUMENTS

| | | | |
|---|---|---|---|
| 3,622,583 | 11/1971 | Dehnert | 106/498 |
| 4,166,179 | 8/1979 | Lotsch | 544/296 |
| 4,277,288 * | 7/1981 | Lawrence et al. | 106/413 |
| 4,844,741 | 7/1989 | Knittel et al. | 106/436 |
| 5,173,116 * | 12/1992 | Roth | 106/401 |
| 5,273,577 | 12/1993 | Liedek et al. | 106/479 |
| 5,441,564 | 8/1995 | Vogt | 106/417 |
| 5,976,238 * | 11/1999 | Erkens et al. | 106/497 |

FOREIGN PATENT DOCUMENTS

| | | |
|---|---|---|
| 1 770 960 | 1/1972 | (DE) . |
| 26 28 409 | 1/1978 | (DE) . |
| 30 19 172 | 11/1981 | (DE) . |
| 42 40 511 | 6/1994 | (DE) . |
| 0 233 601 | 8/1967 | (EP) . |
| 0 212 361 | 3/1987 | (EP) . |
| 0 551 637 | 7/1993 | (EP) . |
| 0 816 440 | 1/1998 | (EP) . |

OTHER PUBLICATIONS

Derwent Abstracts, AN 1992–203858 ç27!, JP 04 132770, May 7, 1992 (Abstract of JP 4132770 (May 1992)).
Derwent Abstracts, AN 1983–60063K ç25!, JP 58–080352, May 14, 1983 (Abstract of JP 58080352 (May 1983)).
Derwent Abstracts, AN 1981–85912D ç47!, JP 56–127668, Oct. 6, 1981 (Abstract of JP 56127668 (Oct. 1981).

* cited by examiner

*Primary Examiner*—Anthony Green
(74) *Attorney, Agent, or Firm*—Oblon, Spivak, McClelland, Maier & Neustadt, P.C.

(57) ABSTRACT

Pigment preparations in granule form comprising as essential constituents from 50 to 99.5% by weight of at least one inorganic pigment and from 0.5 to 50% by weight of at least one organic pigment are prepared and used for coloring polymeric materials.

12 Claims, No Drawings

PIGMENT PREPARATIONS IN GRANULE FORM

The present invention relates to novel pigment preparations in granule form comprising as essential constituents from 50 to 99.5% by weight of at least one inorganic pigment and from 0.5 to 50% by weight of at least one organic pigment.

This invention further relates to the production of these pigment preparations and to their use for coloring polymeric materials.

As known from EP-A-816 440, combining bismuth vanadate with organic pigments gives pigments having high chroma values. Disclosed are pulverulent mixtures of these pigments, which are prepared by dry-milling the finished pigments.

Yet pulverulent pigment preparations have the disadvantage of leading to a pronounced dust nuisance in handling and of exhibiting unsatisfactory flowability in the case of container shipments.

It is an object of the present invention to remedy these defects and to provide pigment preparations having advantageous application properties.

We have found that this object is achieved by pigment preparations in granule form comprising as essential constituents from 50 to 99.5% by weight of at least one inorganic pigment and from 0.5 to 50% by weight of at least one organic pigment.

This invention further provides a process for producing pigment preparations which comprises conjointly wet-milling the as synthesized crude pigments and subsequently drying the pigment suspension millbase with agitation.

This invention also provides for the use of the pigment preparations for coloring polymeric systems.

The pigment preparations of the invention preferably comprise an inorganic pigment selected from a bismuth vanadate pigment, a lead chromate pigment, a cerium sulfide pigment, a rutile pigment or a spinel pigment or a mixture thereof; it will be appreciated that mixtures of pigments of the same class may also be present.

Particularly preferred inorganic pigments are bismuth vanadate pigments and rutile pigments.

Preferred organic pigments for the pigment preparations of the invention are anthraquinone pigments, anthrapyrimidine pigments, azo pigments, azomethine pigments, quinacridone pigments, quinophthalone pigments, diketopyrrolopyrrole pigments, indanthrone pigments, isoindoline pigments, isoindolinone pigments, metal complex pigments, perinone pigments, perylene pigments, phthalocyanine pigments, pyranthrone pigments, pyrazoloquinazolone pigments and thioindigo pigments and also mixtures thereof.

Particularly preferred organic pigments are isoindoline pigments and quinophthalone pigments.

The pigment preparations of the invention are of particular interest for yellow, orange, red and green hues, so that they generally comprise mixtures of multiple yellow pigments or mixtures of yellow pigments with orange pigments, red pigments, brown pigments and/or blue pigments.

The pigment preparations of the invention preferably comprise two or three different pigments. It will be appreciated that they may also comprise a greater number of pigments.

Specific examples of particularly suitable pigments are:

| | |
|---|---|
| bismuth vanadate pigments: | C.I. Pigment Yellow 184; |
| lead chromate pigments: | C.I. Pigment Yellow 34; C.I. Pigment Red 104; |
| cerium sulfide pigments: | C.I. Pigment Orange 75; C.I. Pigment Red 265; |
| rutile pigments: | C.I. Pigment Yellow 53, 157, 158, 159, 160, 161, 162, 163, 164 and 189; C.I. Pigment Brown 24 and 33; |
| spinel pigments: | C.I. Pigment Yellow 119; C.I. Pigment Brown 33, 34, 35, 37, 39 and 40; C.I. Pigment Blue 28, 36 and 72; |
| anthraquinone pigments: | C.I. Pigment Yellow 147 and 199; |
| anthrapyrimidine pigments: | C.I. Pigment Yellow 108; |
| azo pigments: | C.I. Pigment Yellow 3, 13, 62, 74, 151, 168 and 191:1; C.I. Pigment Orange 5, 13, 34, 36, 64 and 67; C.I. Pigment Red 1, 2, 3, 4, 5, 23, 48:1, 48:2, 48:3, 48:4, 49, 49:1, 51:1, 52:1, 53:1, 57:1, 58:2, 58:4, 112, 144, 146, 148, 166, 170, 214, 220, 221 and 251; |
| azomethine pigments: | C.I. Pigment Yellow 129; |
| quinacridone pigments: | C.I. Pigment Orange 48 and 49; C.I. Pigment Red 42, 122, 202 and 206; |
| quinophthalone pigments: | C.I. Pigment Yellow 138; |
| diketopyrrolopyrrole pigments: | C.I. Pigment Orange 71 and 73; C.I. Pigment Red 254, 255, 264, 270 and 272; |
| indanthrone pigments: | C.I. Pigment Blue 60 and 64; |
| isoindoline pigments: | C.I. Pigment Yellow 139 and 185; C.I. Pigment Orange 61 and 69, C.I. Pigment Red 260; |
| isoindolinone pigments: | C.I. Pigment Yellow 109, 110 and 173; |
| metal complex pigments: | C.I. Pigment Yellow 117, 153 and 177; |
| perinone pigments: | C.I. Pigment Orange 43; C.I. Pigment Red 194; |
| perylene pigments: | C.I. Pigment Red 123, 149, 178, 179, 190 and 224; |
| phthalocyanine pigments: | C.I. Pigment Blue 15, 15:1, 15:2, 15:3, 15:4, 15:6 and 16; |
| pyranthrone pigments: | C.I. Pigment Orange 51; C.I. Pigment Red 216; |
| pyrazoloquinazolone pigments: | C.I. Pigment Orange 67; C.I. Pigment Red 251; |
| thioindigo pigments: | C.I. Pigment Red 88. |

Examples of particularly preferred pigments are C.I. Pigment Yellow 184 and 53 and C.I. Pigment Brown 24 and also C.I. Pigment Yellow 138 and 139.

The pigment preparations of the invention are present in granular form, the individual particles generally comprising both inorganic and organic pigment. In general, the granules are predominantly spherical and have a median size within the range from about 5 to 3000 $\mu$m, preferably within the range from 10 to 500 $\mu$m. The granule size customarily has no effect on the tinctorial properties of the pigment preparations of the invention in use.

The pigment preparations of the invention may with advantage be prepared with the aid of the process of the invention by conjointly wet-milling the as-synthesized crude pigments and subsequently drying the pigment suspension millbase with agitation.

The first process step of the conjoint wet milling is performed on the as-synthesized crude pigments. The as-synthesized crude pigments may be, for example, in the form of moist filter cakes or in the form of pigment clinkers obtained after a concluding calcination. The pigments may, if desired, already be coated with, for example, stabilizing coatings, but their particle size and shape is not finalized.

The milling is preferably carried out in an aqueous medium. However, suitable media also include organic solvents, which may be protic or aprotic, and also mixtures of these solvents with each or one another and/or with water. It is favorable to use the liquid used in the final wash of at least one of the crude pigments.

Examples of suitable protic organic solvents are monohydric aliphatic alcohols, especially $C_2$–$C_{12}$ alcohols, and also polyhydric alcohols, especially $C_2$–$C_3$ alkylene glycols, and ether alcohols, especially $C_2$–$C_3$ alkylene glycol $C_1$–$C_4$ alkyl ethers. Specific examples are ethanol, propanol, diethylene glycol and ethylene glycol monobutyl ether.

Examples of suitable aprotic organic solvents are cyclic ethers such as tetrahydrofuran.

The pigments are customarily used in the milling in the form of from 10 to 60% strength by weight suspensions in the solvents mentioned.

It will be appreciated that it is also possible for the pigments used to be accompanied by customary dispersing assistants (non-ionic, anionic or cationic surfactants), whose presence may also be favorable for the subsequent granulation. However, their proportion is customarily not more than 2% by weight, based on the pigments.

The milling may with advantage be effected in an unstirred ball mill or in a stirred ball mill, preferably operated at from 100 to 2000 rpm. Examples of suitable grinding media are glass beads, zirconia beads or sand grains from about 0.4 to 30 mm in diameter.

Milling is customarily carried on until the median pigment particle size ($d_{50}$ value) is within the range from about 0.4 to 2 μm, preferably from 0.8 to 1.5 μm.

After the grinding media have been removed, the pigment suspension obtained is subjected to the agitated drying of the invention.

Examples of apparatus suitable for the large industrial scale therefore include tumble dryers, paddle dryers and force cleaned contact dryers, in each of which the drying is preferably effected under reduced pressure (a pressure within the range from about 50 to 500 mbar). If desired, an additional coarse comminution step may be effected in or outside the drying apparatus.

The drying step may with advantage also be carried out in a spray drying plant in which the suspension to be spray dried is agitated in the feed vessel by stirring. Examples of suitable spray dryers are tower type spray dryers and fluidized bed spray dryers where the water is evaporated by contacting with a hot gas, for example air or nitrogen. The granules can then be directly obtained in the desired particle size.

The pigment preparations of the invention are very useful for coloring polymeric materials such as paints, printing inks and plastics. In these applications, they are especially notable for unexpectedly high color strengths which are significantly improved compared with the pigment powder mixtures of EP-A-816 440.

EXAMPLES

Production and use of pigment preparations according to the invention.

First, the crude pigments were prepared similarly to the following literature methods:

C.I. Pigment Yellow 184: similarly to Example 10 of EP-A-551 637;

C.I. Pigment Yellow 53: similarly to Example 1 of DE-A-30 19 172, but no wet milling;

C.I. Pigment Brown 24: similarly to Example 1 of EP-A-233 601, but no wet milling;

C.I. Pigment Yellow 138: similarly to Example 1 of DE-A-17 70 960;

C.I. Pigment Yellow 139: similarly to Example 1 of DE-A-26 28 409.

The wet milling of the crude pigments was carried out as follows:

a) Pigment preparations comprising bismuth vanadate pigments:

A mixture of 20 g of the crude pigment mixture mentioned in the table and 30 g of water was milled for 20 min in a 100 ml capacity Skandex unit with 90 g of glass beads 1 mm in diameter.

b) Pigment preparations comprising rutile pigment:

A mixture of 30 g of the crude pigment mixture mentioned in the table and 60 g of water was milled for 30 min in a 300 ml milling capacity centrifugal force ball mill with 250 g of glass beads 2 m in diameter.

After removal of the glass beads, the pigment suspensions obtained were dried as follows:

A 10% strength by weight aqueous suspension of the pigment preparation obtained in the milling was dried on a Büchi 190 Mini Spray Dryer at an inlet temperature of 250° C. and an outlet temperature of 110° C. with a throughput of 500 ml/h.

Granular pigment preparations were obtained with a median granule particle size of 40 μm.

The tinctorial properties of the pigment preparations were assessed by subsequently examining paint films prepared as follows: A mixture of 15 g of each pigment preparation and 35 g of an alkydmelamine baking varnish (solids content 56% by weight) was shaken for 60 min with 70 g of glass balls 1 mm in diameter using a Skandex machine, then hidingly applied to aluminum Q-Panels (Erichsen type 238 II film applicator) and baked at 140° C. for 30 Min.

The CIELAB color coordinates were measured using a Zeiss RF 16 spectrophotometer and the D 65 standard illuminant.

The color strength is reported in terms of coloring equivalents (CE) and was determined via the white reduction of the paint. To this end, 36 g of alkyd-melamine baking vanish were shaken with 7.5 g of 2056 titanium dioxide from Kronos and 1.5 g of each pigment preparation with 70 g of glass balls 1 mm in diameter for 60 min on a Skandex machine and then hidingly applied to aluminum Q-Panels and baked, both steps being carried out as described above.

Analogous preparations wherein the finished pigments (i.e., the pigments prepared as described above and then each subjected to a milling to a median particle size ($d_{50}$ value) of 0.8 μm (P.Y.184), 1.3 μm (P.Y.53), 1.1 μm (P.Br.24), 0.8 μm (P.Y.138) and 0.8 μm (P.Y.139)) were used without conjoint milling were assigned the CE value of 100 (standard); the examples are identified by S. CE values<100 mean a higher color strength than that of the standard, CE values>100 accordingly a lower color strength.

The standard preparations were also used as the basis for the reported ΔC* chroma values.

Further details relating to these experiments and their results are recited in the table below. The examples labeled V utilized pigment preparations obtained similarly to Example 1 of EP-A-816 440 by conjoint dry grinding of the finished pigments.

TABLE

| Ex. | x g | inorganic pigment | y g | organic pigment | ΔC* | CE |
|---|---|---|---|---|---|---|
| 1 | 60 | P.Y. 184 | 40 | P.Y. 138 | 0.6 | 98 |
| V1 | 60 | P.Y. 184 | 40 | P.Y. 138 | 1.2 | 99 |
| S1 | 60 | P.Y. 184 | 40 | P.Y. 138 | 0 | 100 |
| 2 | 90 | P.Y. 184 | 10 | P.Y. 138 | 3.5 | 84 |
| V2 | 90 | P.Y. 184 | 10 | P.Y. 138 | 5.0 | 100 |
| S2 | 90 | P.Y. 184 | 10 | P.Y. 138 | 0 | 100 |
| 3 | 99 | P.Y. 184 | 1 | P.Y. 138 | 2.9 | 86 |
| V3 | 99 | P.Y. 184 | 1 | P.Y. 138 | 4.3 | 100 |
| S3 | 99 | P.Y. 184 | 1 | P.Y. 138 | 0 | 100 |
| 4 | 60 | P.Y. 184 | 40 | P.Y. 139 | 5.8 | 75 |
| V4 | 60 | P.Y. 184 | 40 | P.Y. 139 | 4.0 | 86 |
| S4 | 60 | P.Y. 184 | 40 | P.Y. 139 | 0 | 100 |
| 5 | 90 | P.Y. 184 | 10 | P.Y. 139 | 4.5 | 78 |
| V5 | 90 | P.Y. 184 | 10 | P.Y. 139 | 4.5 | 103 |
| S5 | 90 | P.Y. 184 | 10 | P.Y. 139 | 0 | 100 |
| 6 | 99 | P.Y. 184 | 1 | P.Y. 139 | 3.7 | 84 |
| V6 | 99 | P.Y. 184 | 1 | P.Y. 139 | 5.0 | 105 |
| S6 | 99 | P.Y. 184 | 1 | P.Y. 139 | 0 | 100 |
| 7 | 50 | P.Br. 24 | 50 | P.Y. 138 | 8.5 | 63 |
| S7 | 50 | P.Br. 24 | 50 | P.Y. 138 | 0 | 100 |
| 8 | 90 | P.Br. 24 | 10 | P.Y. 138 | 4.9 | 75 |
| S8 | 90 | P.Br. 24 | 10 | P.Y. 138 | 0 | 100 |
| 9 | 99 | P.Br. 24 | 1 | P.Y. 138 | 3.7 | 82 |
| S9 | 99 | P.Br. 24 | 1 | P.Y. 138 | 0 | 100 |
| 10 | 50 | P.Br. 24 | 50 | P.Y. 139 | 3.9 | 83 |
| S10 | 50 | P.Br. 24 | 50 | P.Y. 139 | 0 | 100 |
| 11 | 90 | P.Br. 24 | 10 | P.Y. 139 | 2.7 | 86 |
| S11 | 90 | P.Br. 24 | 10 | P.Y. 139 | 0 | 100 |
| 12 | 99 | P.Br. 24 | 1 | P.Y. 139 | 1.1 | 93 |
| S12 | 99 | P.Br. 24 | 1 | P.Y. 139 | 0 | 100 |
| 13 | 50 | P.Y. 53 | 50 | P.Y. 138 | 5.3 | 75 |
| S13 | 50 | P.Y. 53 | 50 | P.Y. 138 | 0 | 100 |
| 14 | 90 | P.Y. 53 | 10 | P.Y. 138 | 4.3 | 75 |
| S14 | 90 | P.Y. 53 | 10 | P.Y. 138 | 0 | 100 |
| 15 | 99 | P.Y. 53 | 1 | P.Y. 138 | 1.1 | 93 |
| S15 | 99 | P.Y. 53 | 1 | P.Y. 138 | 0 | 100 |
| 16 | 50 | P.Y. 53 | 50 | P.Y. 139 | 5.3 | 75 |
| S16 | 50 | P.Y. 53 | 50 | P.Y. 139 | 0 | 100 |
| 17 | 90 | P.Y. 53 | 10 | P.Y. 139 | 4.3 | 75 |
| S17 | 90 | P.Y. 53 | 10 | P.Y. 139 | 0 | 100 |
| 18 | 99 | P.Y. 53 | 1 | P.Y. 139 | 2.3 | 81 |
| S18 | 99 | P.Y. 53 | 1 | P.Y. 139 | 0 | 100 |

We claim:

1. A pigment preparation in granule form consisting essentially of:

from 50 to 99.5% by weight of at least one synthetically produced inorganic pigment; and from 0.5 to 50% by weight of at least one synthetically produced organic pigment, obtained by wet-milling a mixture of said pigments in as synthesized crude form, with or without a dispersing assistant in an amount up to 2% by weight of the pigments, to produce a pigment suspension millbase and subjecting said millbase to agitated drying to obtain granules.

2. The pigment preparation as claimed in claim 1, wherein the inorganic pigment present is a bismuth vanadate pigment, a lead chromate pigment, a cerium sulfide pigment, a rutile pigment or a spinel pigment or a mixture thereof.

3. The pigment preparation as claimed in claim 1, wherein the organic pigment present is an anthraquinone pigment, an anthrapyrimidine pigment, an azo pigment, an azomethine pigment, a quinacridone pigment, a quinophthalone pigment, a diketopyrolopyrrole pigment, an indanthrone pigment, an isoindoline pigment, an isoindolinone pigment, a metal complex pigment, a perinone pigment, a perylene pigment, a phthalocyanine pigment, a pyranthrone pigment, a pyrazoloquinazolone pigment or a thioindigo pigment or a mixture thereof.

4. The pigment preparation as claimed in claim 1, comprising a mixture of multiple yellow pigments or a mixture of a yellow pigment with an orange pigment, red pigment, brown pigment and/or blue pigment.

5. The pigment preparation as claimed in claim 1, wherein the inorganic pigment present is a bismuth vanadate pigment and/or rutile pigment.

6. The pigment preparation as claimed in claim 1, wherein the organic pigment present is a quinophthalone pigment and/or an isoindoline pigment.

7. A method of coloring a polymeric material, which comprises incorporating the pigment preparation of claim 1 into said polymeric material.

8. The pigment preparation of claim 1, wherein the median size of the granules is 10–500 µm.

9. Pigment preparations as claimed in claim 5, wherein the organic pigment present is a quinophthalone pigment and/or an isoindoline pigment.

10. A process for producing a pigment preparation in granule form consisting essentially of:

from 50 to 99.5% by weight of at least one synthetically produced inorganic pigment;

and from 0.5 to 50% by weight of at least one synthetically produced organic pigment, which comprises conjointly wet-milling a mixture of said pigments, with or without a dispersing assistant in an amount up to 2% by weight of the pigments, in as synthesized crude form to produce a pigment suspension millbase and subsequently drying the pigment suspension millbase with agitation to obtain granules.

11. A process as claimed in claim 10, wherein the wet milling is carried out in the presence of water, protic organic solvents or aprotic organic solvents or mixtures thereof.

12. A process as claimed in claim 10, wherein the drying is carried out in a spray drying plant.

* * * * *